(No Model.)
J. A. MILLIKEN.
WATER GAGE.
No. 529,560. Patented Nov. 20, 1894.
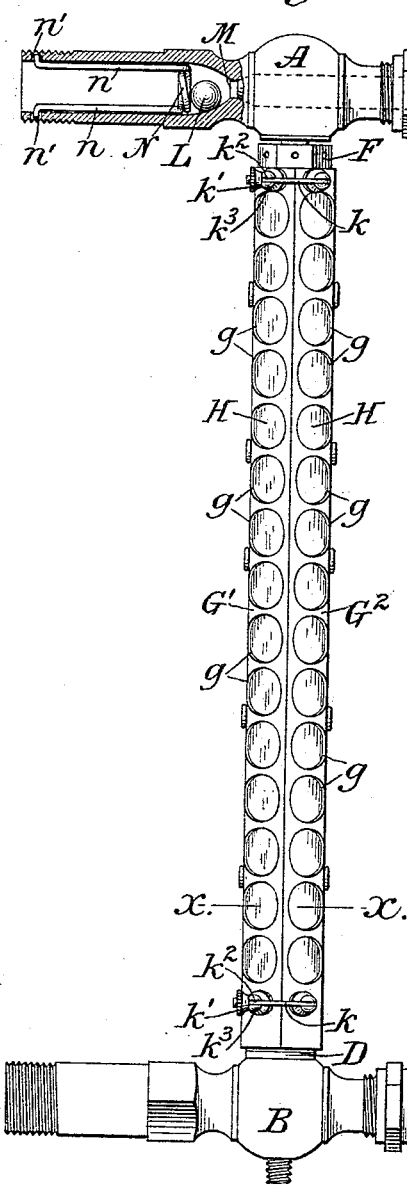
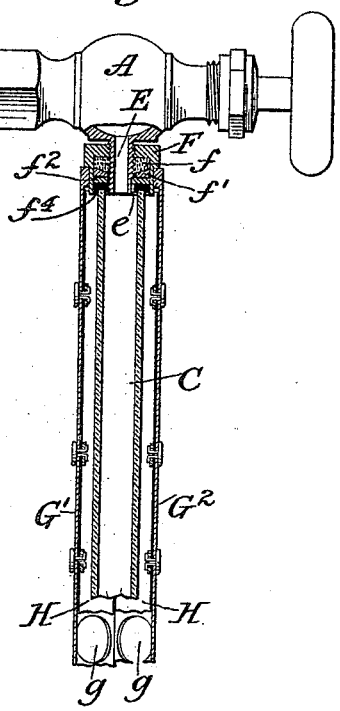
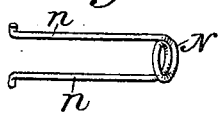
Fig. 4.
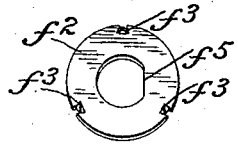
Fig. 5.
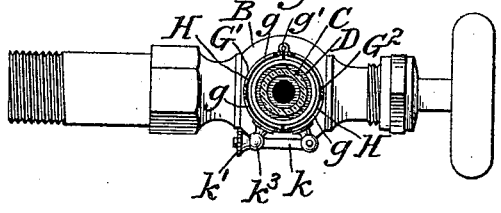
Fig. 3.
Attest:
A. N. Jesbera
A. Kidder
Inventor:
John A. Milliken
by William B. Greeley
Att'y.

UNITED STATES PATENT OFFICE.

JOHN A. MILLIKEN, OF BROOKLYN, ASSIGNOR TO ANNA M. McLEWEE, OF NEW YORK, N. Y.

WATER-GAGE.

SPECIFICATION forming part of Letters Patent No. 529,560, dated November 20, 1894.

Application filed January 15, 1894. Serial No. 496,856. (No model.)

*To all whom it may concern:*

Be it known that I, JOHN A. MILLIKEN, of Brooklyn, in the county of Kings and State of New York, have invented certain new and useful Improvements in Water-Gages; and I do hereby declare that the following is a full and exact description thereof, reference being had to the accompanying drawings, and to the letters of reference marked thereon, making a part of this specification.

The liability of the ordinary glass tubes of water-gages to be broken by drafts of cold air and the difficulty of securing such tubes in position in such manner as to make a tight joint without breaking the tube are well known and various attempts have been made to protect the tube and to improve the means for securing it in position. In one case it has been proposed to surround the usual glass tube with a second glass tube, in part for the purpose of protecting the inner tube and in part, as alleged, for the purpose of magnifying the contents of the inner tube. This device is to some degree effective in protecting the inner tube, but is objectionable because of the great difficulty in properly disposing the two tubes with respect to each other and because of the complicated and expensive means which are required for the purpose of holding the tubes in place.

The object of this invention is in the first place to provide means for the effective protection of the ordinary glass tube which can be applied or removed without difficulty, and shall be compact and neat in appearance and shall not be liable to destruction by a blow.

The object of the invention is further to improve the means for securing in position the usual glass tube so that when broken it can be readily replaced by another and tight joints formed without endangering the tube.

A still further purpose is to improve the means usually employed for preventing the escape of steam and water when the tube breaks, whereby the operation of such means is made more certain.

The details of construction wherein the improvement consists will be described fully hereinafter.

In the accompanying drawings wherein I have illustrated the application of my improvement: Figure 1 is a side elevation of a water-gage with the upper globe-valve partly in section. Fig. 2 is a view partly in section and partly in elevation of the upper portion of the water-gage. Fig. 3 is a horizontal section on the line $x$—$x$ of Fig. 1. Fig. 4 is a perspective view of the holder for the check-valve. Fig. 5 is a perspective view somewhat enlarged, of one of the washers which forms a part of the means for holding the usual glass tube in position.

The upper and lower globe-valves A and B, which are connected to the boiler and support between them the glass tube C, may be of any usual or preferred construction. The lower valve B supports a suitable seat D to receive the lower end of the glass tube C and the upper valve A supports opposite the seat D an elongated, exteriorly-threaded nipple E. Upon the nipple E is placed an inverted cup or stuffing-box F which may be screwed up or down upon the nipple. Within the cup or stuffing-box is placed first a packing ring $f$ of asbestos or other relatively soft and suitable material, next a division plate $f'$, then preferably a washer $f^2$ which forms a tight joint with the washer $f'$, with as little friction as possible and which is preferably formed on its opposite face with teeth $f^3$, and finally a gasket $f^4$ which bears upon the end of the glass tube C and forms a tight joint therewith. The gasket $f^4$ is not very likely to turn upon the end of the glass tube as the cup F is screwed down, but in order to effectually prevent such turning, which would soon cut the gasket, I prefer to flatten one or more sides of the nipple E, as at $e$, and to form the washer $f^2$, as at $f^5$, to fit thereon so that rotation of the washer will be impossible. The gasket $f^4$ may also be flattened to fit the nipple, but I prefer to form the washer $f^2$ with the teeth $f^3$ to engage the gasket $f^4$ to prevent it from turning. The seat for the lower end of the glass tube might be constructed in a similar manner, if desired, but it is necessary only that it should be provided with a suitable gasket to make a tight joint with the end of the tube when the latter is pressed down upon it.

In placing the tube in position the cup or stuffing-box F is screwed up until the tube can be placed between it and the seat for the other end. It is then screwed down until it bears tightly upon the end of the tube thereby making a tight joint between the tube and the gasket and at the same time, by reason of the interposition of the division plate, compressing the packing ring $f$ to form a tight joint between the cup and the nipple.

The protector for the inner tube is so formed as to permit of its being removed or put in place readily without disturbing the tube C. It consists of a sleeve or cage made in separable parts G' and G² which are capable of being secured together in position outside of the tube C and preferably to be clasped upon the cup F and seat D. It is composed of a two-part cage of brass or other suitable material having numerous perforations $g, g$, and lined with pieces of isin-glass H or other transparent material which will close the perforations $g, g$, and exclude air while not interfering materially with the site of the inner tube. The two parts G' and G² of the cage are united by hinges, as indicated at $g'$ in Fig. 3, along one edge and are held together by latches applied on the other edge. Each latch consists of a rod or bar $k$ which is pivoted at one end to one part of the cage and at its free end is screw-threaded to receive a nut $k'$ whereby, when the rod or bar $k$ has been swung into the slot $k^2$ of a stud $k^3$ which is fixed to the other part of the cage, the nut $k'$ may be rotated to draw the parts together and clamp them firmly in position about the cup F and seat D. The perforated shell or cage fully protects the tube C against injury by blows and thereby enables the usual guard-rods to be dispensed with. It is not necessary that the joints of the shell should be air-tight, but, having its perforations closed by isin-glass or other suitable transparent material, it effectually protects the tube C from the drafts of cold air. Should the glass tube break the shell will prevent the flying of broken pieces of glass and it can be readily removed and replaced when a new or clean glass is substituted for a broken or discolored one.

It has been usual heretofore to place within the stem of each of the globe-valves A and B a ball or equivalent valve L which, it is intended, shall be thrust against its seat M by the sudden rush of steam or of water when the glass tube C breaks and thereby prevent the escape of steam or water. The ball is usually prevented from escaping by a pin inserted through holes near the end of the stem so that they are not exposed when the valve has been screwed home. It therefore happens sometimes that the ball is so far from its seat as to fail to be driven to its seat by the first rush of steam or water and therefore, as pressure has been established in front of the ball as well as behind it, to remain where it happens to be, allowing the continued escape of steam or water. With the object of preventing this and of holding the ball so near its seat as to insure its being driven into the same by the first rush of steam or water and yet to permit the easy removal of the ball for the purpose of cleaning, I have provided a holder which engages the stem of the valve near its extremity and can be removed readily in order to permit cleaning of the ball or the substitution of another for it whenever the valve is removed from the boiler. This holder comprises a head N and arms $n, n$, which are adapted to engage slots or holes $n'$, $n'$, and is formed preferably of a single piece of wire which is coiled at its middle portion to form the head N.

I have herein referred to the glass tube as held between two glove-valves A and B but it is obvious that so far as my present invention is concerned the particular construction of the valves or other parts between which the tube is held is immaterial. In other respects also the construction represented in the drawings may be varied without departing from the spirit of my invention.

I claim as my invention—

1. The combination with a stuffing-box and a stem upon which it is adjustable against the end of a tube, of a gasket to bear against the end of the tube, a ring of relatively soft packing material and a division plate separating said ring and gasket and movable upon the stem whereby the movement of the stuffing-box against the end of the tube makes a tight joint between the gasket and the tube and at the same time packs the softer material about the stem, substantially as shown and described.

2. In a water-gage, the combination of a seat for one end of the gage-tube, a screw-threaded nipple, oppositely disposed supports for said seat and nipple, a cup adjustable on said nipple, and a packing ring, a division plate, a washer, and a gasket carried by said cup to form a packing for the other end of said tube, substantially as shown and described.

3. In a water-gage, the combination of a seat for one end of the gage-tube, a screw-threaded nipple having a flattened side, oppositely disposed supports for said seat and nipple, a cup adjustable on said nipple, a washer fitted upon the flattened nipple within the cup and having teeth, and a gasket engaged by the teeth of the washer, whereby the gasket is held from turning as the cup is turned down upon the end of the gage-tube, substantially as shown and described.

4. In a water-gage, the combination of upper and lower globe-valves, a seat for the lower end of the gage-tube, a cup to receive the upper end of said tube, and a protecting shell divided longitudinally to form separate parts, said parts being hinged together along one edge and being adapted to be clamped to each end around said cup and said seat, and latches applied to the other edges of said parts to hold them together, substantially as shown and described.

5. In a water-gage, the combination of upper and lower globe-valves, a seat for the lower end of the gage-tube, a cup to receive the upper end of said tube, and a protecting shell divided longitudinally to form separate parts, said parts being hinged together along one edge and being adapted to be clamped to each end around said cup and said seat, and latches applied to the other edges of said parts to hold them together, each of said latches being composed of a rod pivoted to one part of the shell and having a nut screw-threaded upon its other end and a slotted stud fixed to the other part of the gage, substantially as shown and described.

6. In a water-gage, the combination of a valve-stem, a ball-valve disposed within said stem and a holder for said ball composed of a wire bent to form a head and arms, the latter being adapted to engage said valve-stem near its extremity, substantially as shown and described.

In testimony whereof I have signed my name to this specification in the presence of two subscribing witnesses.

JOHN A. MILLIKEN.

Witnesses:
HENRY E. McLEWEE,
A. N. JESBERA.